United States Patent
Lin (10) Patent No.: US 11,629,780 B2
(45) Date of Patent: Apr. 18, 2023

(54) ACTUATOR AND TRANSMISSION STRUCTURE THEREOF

(71) Applicant: TIMOTION TECHNOLOGY CO., LTD., New Taipei (TW)

(72) Inventor: Yu-Chang Lin, New Taipei (TW)

(73) Assignee: TIMOTION TECHNOLOGY., LTD., New Taipei (TW)

( * ) Notice: Subject to any disclaimer, the term of this patent is extended or adjusted under 35 U.S.C. 154(b) by 0 days.

(21) Appl. No.: 17/492,559

(22) Filed: Oct. 2, 2021

(65) Prior Publication Data
US 2023/0054016 A1 Feb. 23, 2023

(30) Foreign Application Priority Data
Aug. 20, 2021 (TW) ................... 110209856

(51) Int. Cl.
*F16H 25/24* (2006.01)
*F16H 25/20* (2006.01)

(52) U.S. Cl.
CPC . *F16H 25/2454* (2013.01); *F16H 2025/2071* (2013.01)

(58) Field of Classification Search
CPC .. F16H 25/20; F16H 25/24; F16H 2025/2062; F16H 25/2454; F16H 2025/2071
See application file for complete search history.

(56) References Cited

U.S. PATENT DOCUMENTS

| | | | | |
|---|---|---|---|---|
| 4,697,672 A * | 10/1987 | Linton | .................... | F16H 35/10 188/134 |
| 4,834,225 A * | 5/1989 | Klopfenstein | .......... | F16D 67/00 188/134 |
| 5,398,780 A * | 3/1995 | Althof | ..................... | F16H 25/20 188/185 |
| 5,655,636 A * | 8/1997 | Lang | ................... | F16H 25/2021 188/134 |
| 2016/0229546 A1 * | 8/2016 | Chavignier | ......... | F16H 25/2204 |
| 2016/0297514 A1 * | 10/2016 | Turpin | ................ | F16H 25/2454 |
| 2016/0369877 A1 * | 12/2016 | Gitnes | ................ | F16H 25/2454 |
| 2018/0029508 A1 * | 2/2018 | Carl | ........................ | F16D 49/04 |
| 2018/0080535 A1 * | 3/2018 | Vermande | ............. | F16D 65/567 |
| 2018/0313436 A1 * | 11/2018 | Nielsen | ................... | F16H 25/20 |
| 2022/0185448 A1 * | 6/2022 | Rozeboom | .............. | B64C 13/34 |

* cited by examiner

*Primary Examiner* — David M Fenstermacher
(74) *Attorney, Agent, or Firm* — Chung-Ming Shih; HDLS IPR Services (57) ABSTRACT

An actuator and a transmission structure thereof. The transmission structure (3) includes a screw nut (31) and a ratchet guiding sleeve (32). The screw nut (31) includes one or a plurality of pawls (311). The ratchet guiding sleeve (32) is mounted on the screw nut (31), and the screw nut (31) is able to rotate relative to the ratchet guiding sleeve (32). The ratchet guiding sleeve (32) includes a ring ratchet (321) disposed on an inner circumference thereof and a plurality of track slots (322) disposed on an outer circumference thereof. One or a plurality of pawls (311) abut against the ring ratchet (321), thereby achieving the effect of smooth movements of the actuator (10) and the transmission structure (3).

18 Claims, 12 Drawing Sheets

ACTUATOR AND TRANSMISSION STRUCTURE THEREOF

BACKGROUND OF THE DISCLOSURE

Technical Field

The technical field of the present disclosure relates to a screw nut structure of an actuator, and in particular, to an actuator and a transmission structure thereof.

Description of Related Art

An actuator mainly includes an outer tube, an inner tube, a screw nut, a screw rod, and a motor. The screw nut penetrates into the outer tube and includes one end attached to the inner tube. The screw nut has a hollow shape and the screw rod penetrates therethrough. The inner side of one end of the screw nut is formed of threads for engaging with the screw rod. The motor is connected to the screw rod and drives the screw rod to rotate. When the screw rod rotates, it drives the screw nut to move axially, and the inner tube also moves axially along with the screw nut at the same time.

However, since the aforementioned screw nut is attached to the inner tube via frictional force, as the screw nut may be subject to cold contraction or the thread processing precision may be poor, the frictional force between the screw nut and the screw rod may become greater than that between the screw nut and the inner tube, causing the screw nut to be unable to move vertically on the screw rod, and the screw nut cannot drive the inner tube to extend outward or retract inward. Accordingly, it is a research and development objective for actuator manufacturers to prevent excessive frictional force between the screw nut and the screw rod.

In view of the above, the inventor seeks to overcome the aforementioned drawbacks associated with the related art and aims to provide an effective solution through extensive researches along with utilization of academic principles and knowledge.

SUMMARY OF THE DISCLOSURE

The present disclosure provides an actuator and a transmission structure thereof, such that when the pawl is blocked and retained by the ring ratchet, the frictional force between the lead screw and the screw nut may be maintained within a predefined value to achieve the effect of smooth movement of the actuator and the transmission structure thereof.

According to an exemplary embodiment of the present disclosure, a transmission structure of an actuator is provided. The transmission structure includes: a screw nut having at least one pawl extended therefrom; and a ratchet guiding sleeve mounted on the screw nut, and the screw nut configured to rotate relative to the ratchet guiding sleeve; the ratchet guiding sleeve having a ring ratchet disposed on an inner circumference thereof and a plurality of track slots disposed on an outer circumference thereof, and the at least one pawl abutting against the ring ratchet.

According to an exemplary of the present disclosure, an actuator is provided. The actuator includes: a housing having an outer tube; the outer tube having an inner wall and defined with an axial direction; the inner wall having a plurality of protruding tracks disposed along the axial direction; a driving mechanism having a lead screw, the lead screw penetrating to an internal of the outer tube; and a transmission structure according to the aforementioned content, and the plurality of protruding tracks are embedded in the plurality of track slots.

According to the above, when the lead screw drives the screw nut to rotate toward the first rotational direction, the pawl is blocked and retained by the ring ratchet, such that the lead screw and the screw nut are prevented from fastening firmly with each other, thereby maintaining the frictional force between the lead screw and the screw nut within a predefined value. Consequently, the situation where the frictional force between the lead screw and the screw nut becomes greater than that between the screw nut and the inner tube may be prevented, such that the screw nut is able to stably drive the inner tube to extend outward to achieve the effect of smooth movements for the actuator and the transmission structure thereof.

According to the above, when the lead screw drives the screw nut to rotate toward the second rotational direction, the pawl is able to slide relative to the ring ratchet. The screw nut is not limited by the ratchet guiding sleeve such that it is able to drive the inner tube to retract inward swiftly, thereby achieving the effect of one-way quick release for the actuator and the transmission structure thereof.

DETAILED DESCRIPTION

The technical contents of this disclosure will become apparent with the detailed description of embodiments accompanied with the illustration of related drawings as follows. It is intended that the embodiments and drawings disclosed herein are to be considered illustrative rather than restrictive.

Please refer to FIG. 1 to FIG. 12. The present disclosure provides an actuator and a transmission structure thereof. The actuator 10 mainly includes a housing 1, a driving mechanism 2 and a transmission structure 3. The transmission structure 3 mainly includes a screw nut 31 and a ratchet guiding sleeve 32.

As shown in FIG. 1 and FIG. 7 to FIG. 12, the housing 1 has an outer tube 11. The outer tube 11 includes an inner wall 12 and is defined with an axial direction. The inner wall 12 has a plurality of protruding tracks 13 disposed along the axial direction.

As shown in FIG. 1 and FIG. 5 to FIG. 12, the driving mechanism 2 includes a motor 21 and a lead screw 22. The motor 22 is received in the housing 1. The lead screw 22 penetrates into the internal of the outer tube 1 and is driven by the motor 21 to rotate.

As shown in FIG. 1 to FIG. 12, the transmission structure 3 includes a screw nut 31 and a ratchet guiding sleeve 32. The screw nut 31 is mounted to and engaged with the lead screw 22. The crew nut 31 includes one or a plurality of pawls 311 extended therefrom. The ratchet guiding sleeve 32 is mounted on the screw nut 31, and the screw nut 31 is configured to rotate relative to the ratchet guiding sleeve 32. The ratchet guiding sleeve 32 includes a ring ratchet 321 disposed on inner circumference thereof and a plurality of track slots 322 disposed on the outer circumference thereof. The pawl 311 abuts against the ring ratchet 321. Each of the protruding tracks 13 is embedded in each of the track slot 322 and is configured to slide relative to each of the track slot 322, such that the ratchet guiding sleeve 32 may solely slide relative to the outer tube 11 along the axial direction. Accordingly, when the lead screw 22 rotates, the screw nut 31 is limited by the ratchet guiding sleeve 32 to extend outward or retract inward along the axial direction.

The following provides detailed explanation. The screw nut 31 includes a main body 33 and a collar 34. The main body 33 is mounted to and engaged with the lead screw 22. One end of the main body 33 includes a plurality of protrusions 331 extended therefrom. The collar 34 is defined with a circumferential direction. The collar 34 includes a plurality of notches 341 disposed on one end thereof and one or a plurality of elastic arms 342 disposed on another end thereof and extended along the circumferential direction. One or a plurality of pawls 311 protrude from the rear end of one or a plurality of elastic arms 342. Each of the protrusions 331 is firmly embedded into each of the notches 341 to make the collar 34 be fixed to the main body 33. In addition, the collar 34 includes a plurality of locking slots 343 formed thereon.

Furthermore, the main body 33 of the present disclosure is made of the material of polyoxymethylene (POM), and the collar 34 is made of the material of polyamide (PA) or polycarbonate (PC). When the plastic material is deformed under the condition of thermal expansion and cold contraction, the collar 34 may be removed from the main body 33 for replacement easily and swiftly. Nevertheless, the materials of the main body 33 and the collar 34 may be adjusted depending upon the needs and shall not be limited to the above materials. In addition, the main body 33 and the collar 34 may also be integrally formed elements or formed in one piece.

Moreover, the outer circumference of the main body 33 includes a ring slot 332. The ratchet guiding sleeve 32 includes a ring member 323 extended on the inner circumference thereof and a pressing member 324 protruded from the outer circumference thereof. The ring member 323 is embedded into the ring slot 332 and may rotate relative to the ring slot 332. The pressing member 323 is used for pressing a limit switch (not shown in the drawings) or passing sensor (not shown in the drawings) for detecting the location of the screw nut 31. In addition, the ratchet guiding sleeve 32 is a C-shaped ring sleeve, here is not intended to be limited.

Furthermore, the screw nut 31 further includes a retainer 35, an engagement key 36 and an elastic member 37. The retainer 35 includes a plurality of pins 351 extended on the outer circumference thereof. Each of the pins 351 is locked on each of the locking slots 343 To make the retainer 35 be fixed to one end of the collar 34 away from the main body 33. The engagement key 36 is mounted to and engaged (screwed) with the lead screw 22. The engagement key 36 is received inside the collar 34 and one end thereof is blocked and retained by the retainer 35. The elastic member 37 is elastically supported between the engagement key 36 and the main body 33.

In addition, in actual application, the lead screw 22 may have multiple sizes in pitch. Accordingly, the elastic element 37 is used for automatically adjusting the spacing between the engagement key 36 and the main body 33, such that the inner threads of the engagement key 36 may be more precisely aligned with the outer threads of the lead screw 22, thereby increasing the engagement stability between the transmission structure 3 and the lead screw 22. Furthermore, the screw nut 31 further includes a connecting sleeve 38. The connecting sleeve 38 is mounted on the exterior of the main body 33. The actuator 10 of the present disclosure further includes an inner tube 4. The inner tube 4 is mounted on the exterior of the connecting sleeve 38. In other words, the main body 33 is fixed to the inner tube 4 via the connecting sleeve 38. The connecting sleeve 38 is configured to drive the inner tube 4 to move along with the screw nut 31.

The following provides further detailed description. The ring ratchet 321 is a mechanical mechanism capable of maintaining the rotational movement of the pawl 311 to be at single direction. Accordingly, when the screw nut 31 rotates toward a first rotational direction, the pawl 311 is blocked and retained by the ring ratchet 321, and when the screw nut 31 rotates toward a second rotational direction, the pawl 311 slides relative to the ring ratchet 321. The first rotational direction is opposite to the second rotational direction.

FIG. 7 to FIG. 12 are schematic views showing the state of use of the actuator 10 and the transmission structure 3 of the present disclosure. First, as shown in FIG. 7 to FIG. 10, when the lead screw 22 drives the screw nut 31 to rotate toward the first rotational direction, the pawl 311 is blocked and retained by the ring ratchet 321, such that the lead screw 22 and the screw nut 31 may be prevented from fastening firmly with each other, thereby maintaining the frictional force between the lead screw 22 and the screw nut 31 within a predefined value. The predefined value of the frictional force between the lead screw 22 and the crew nut 31 is smaller than the frictional force between the screw nut 31 and the inner tube 4, such that the situation where the frictional force between the lead screw 22 and the screw nut 31 becomes greater than that between the screw nut 31 and the inner tube 4 may be prevented, As a result, the screw nut 31 may stably drive the inner tube 4 to extend outward, thereby achieving the effect of smooth movements for the actuator 10 and the transmission structure 3 thereof.

Figure 1:
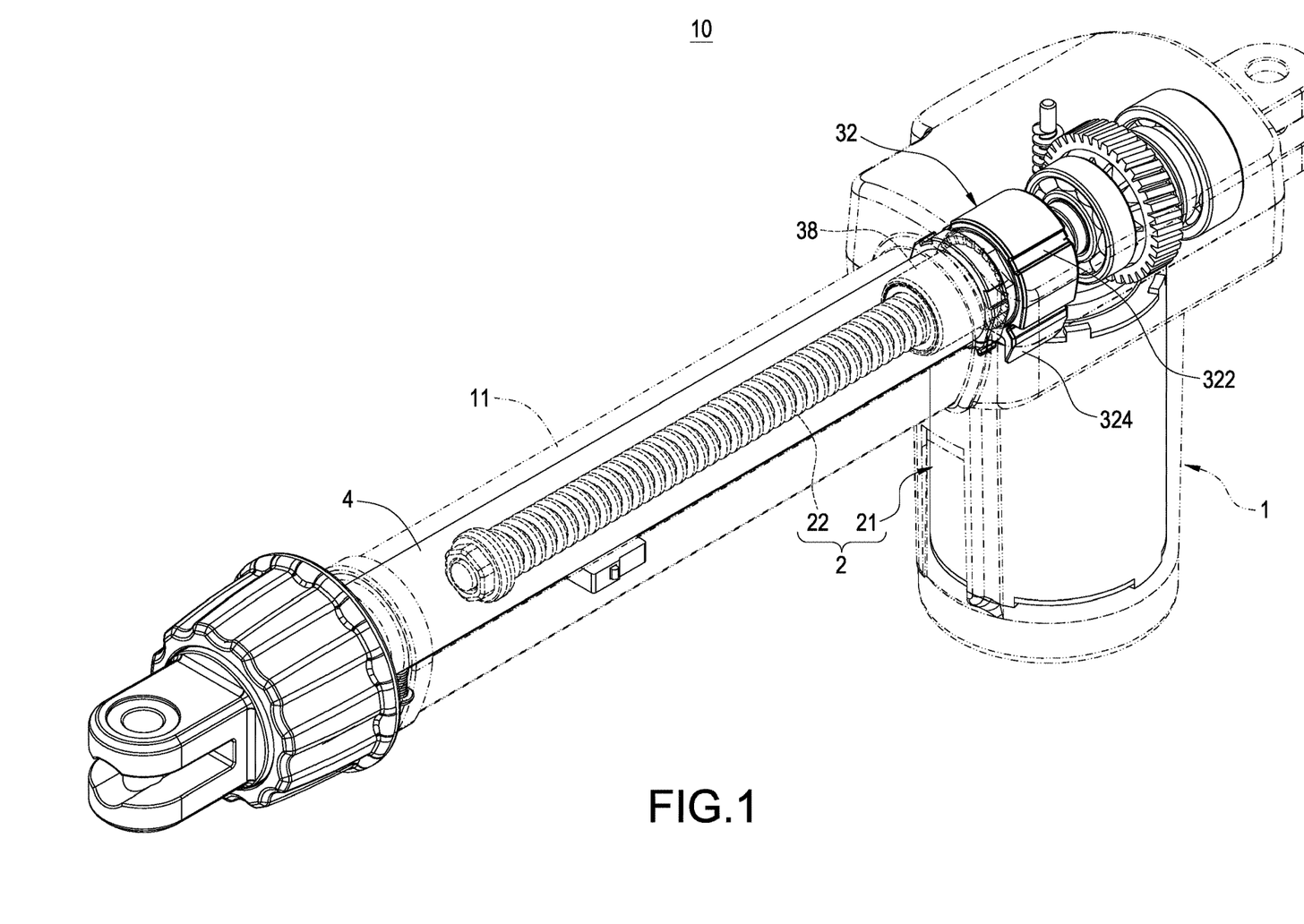
FIG. 1 is a perspective assembly view of the actuator according to the present disclosure.
Figure 2:
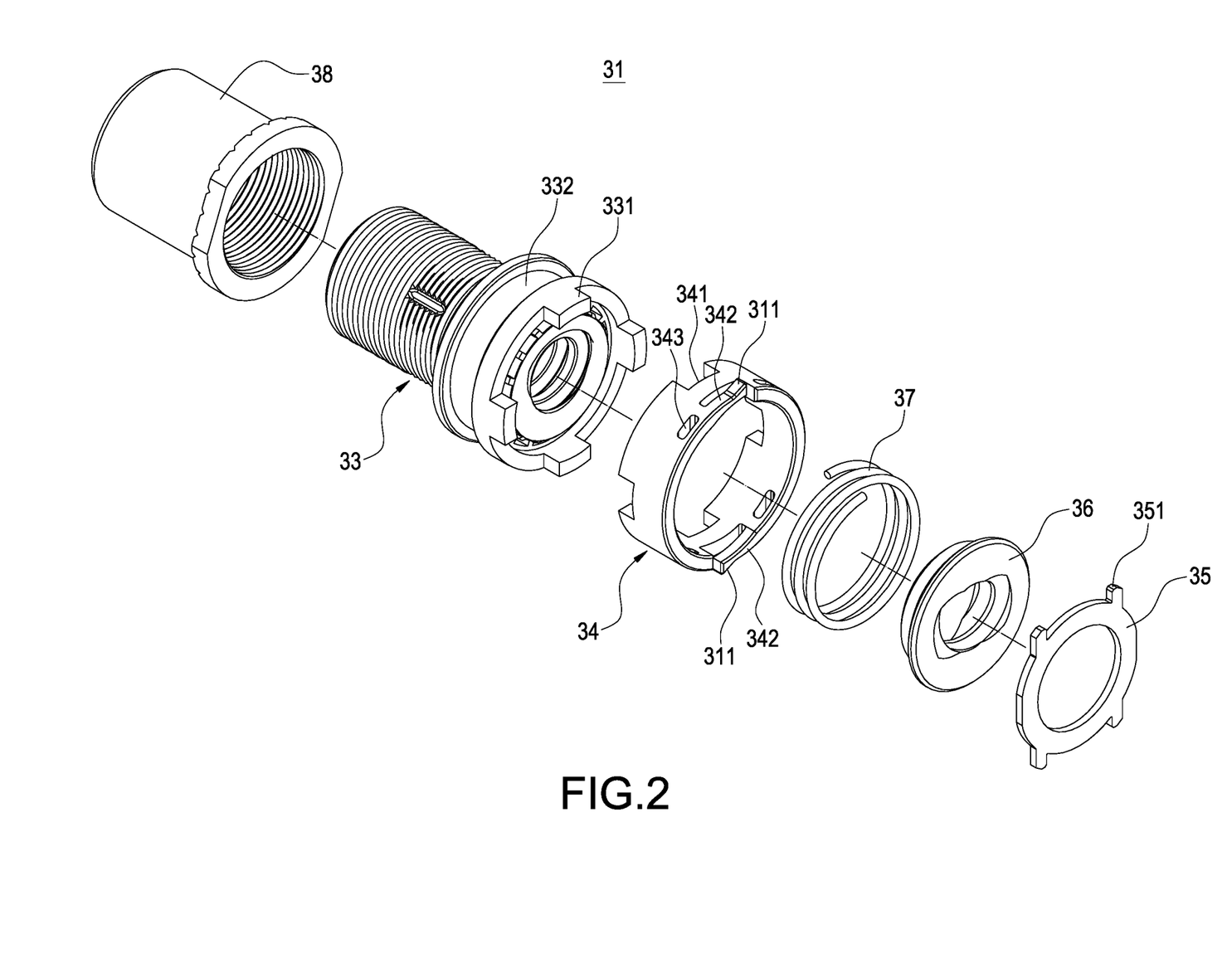
FIG. 2 is a perspective exploded view of the screw nut of the actuator.
Figure 3:
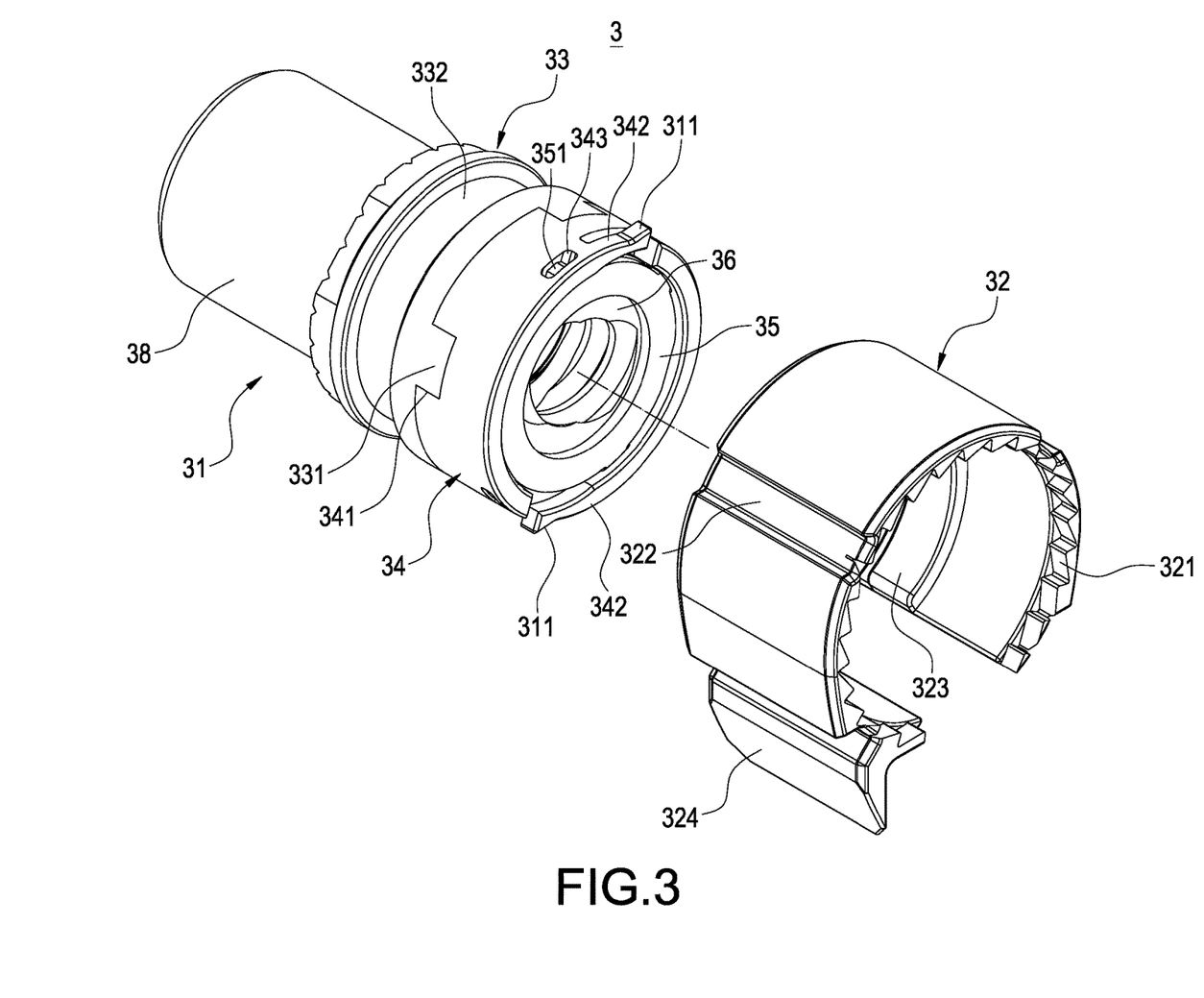
FIG. 3 is a perspective exploded view of the transmission structure of the actuator.
Figure 4:
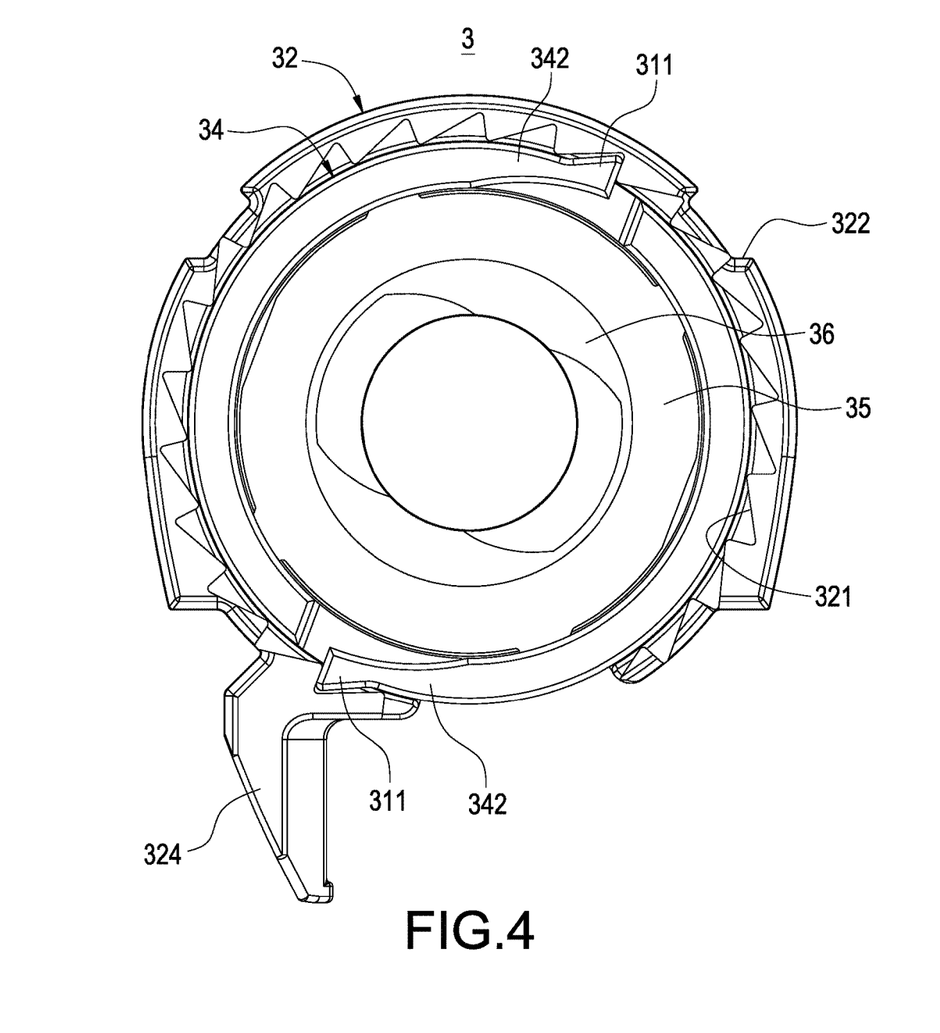
FIG. 4 is an assembly front view of the transmission structure of the actuator.
Figure 5:
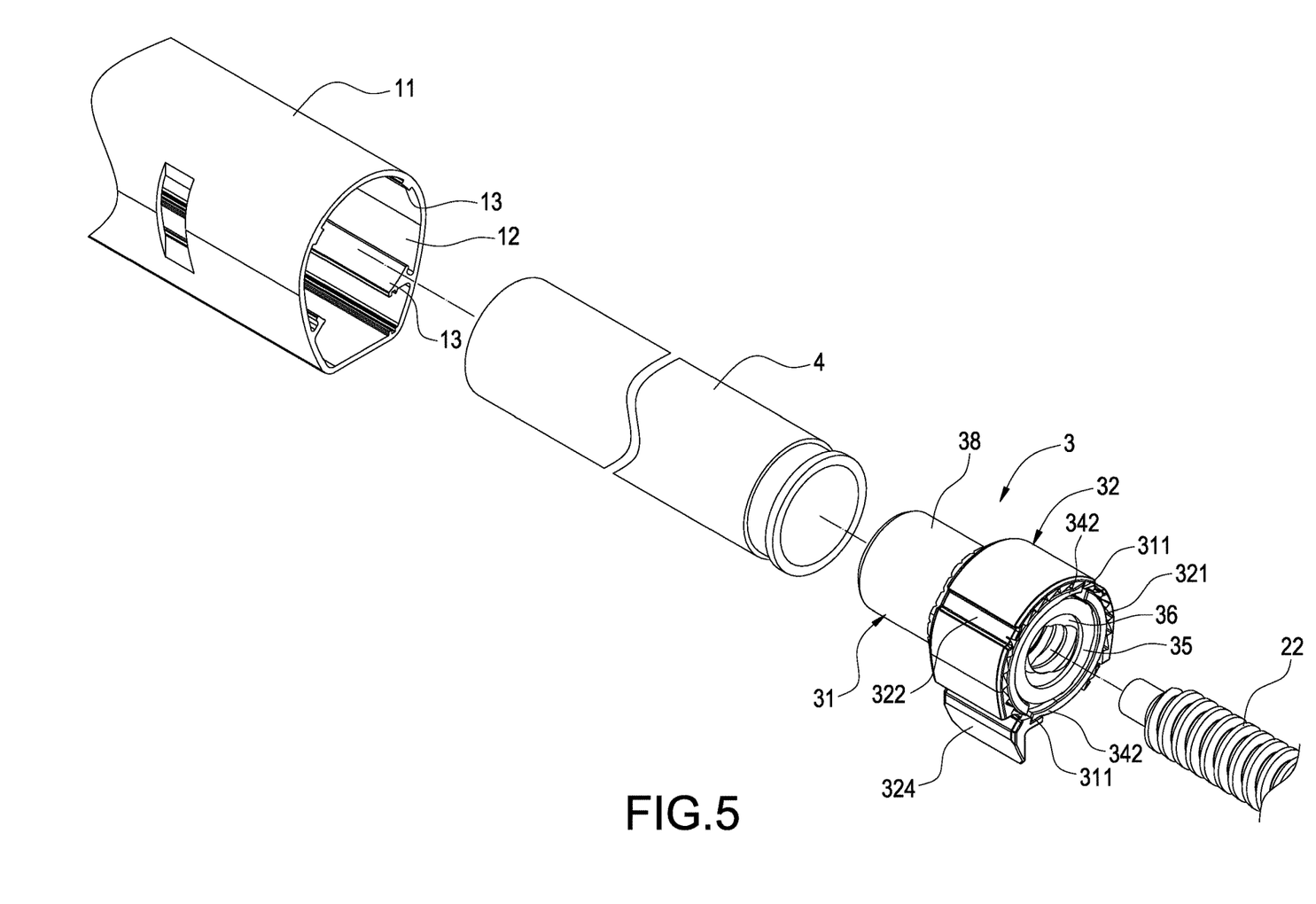
FIG. 5 is another perspective exploded view of the actuator according to the present disclosure.
Figure 6:
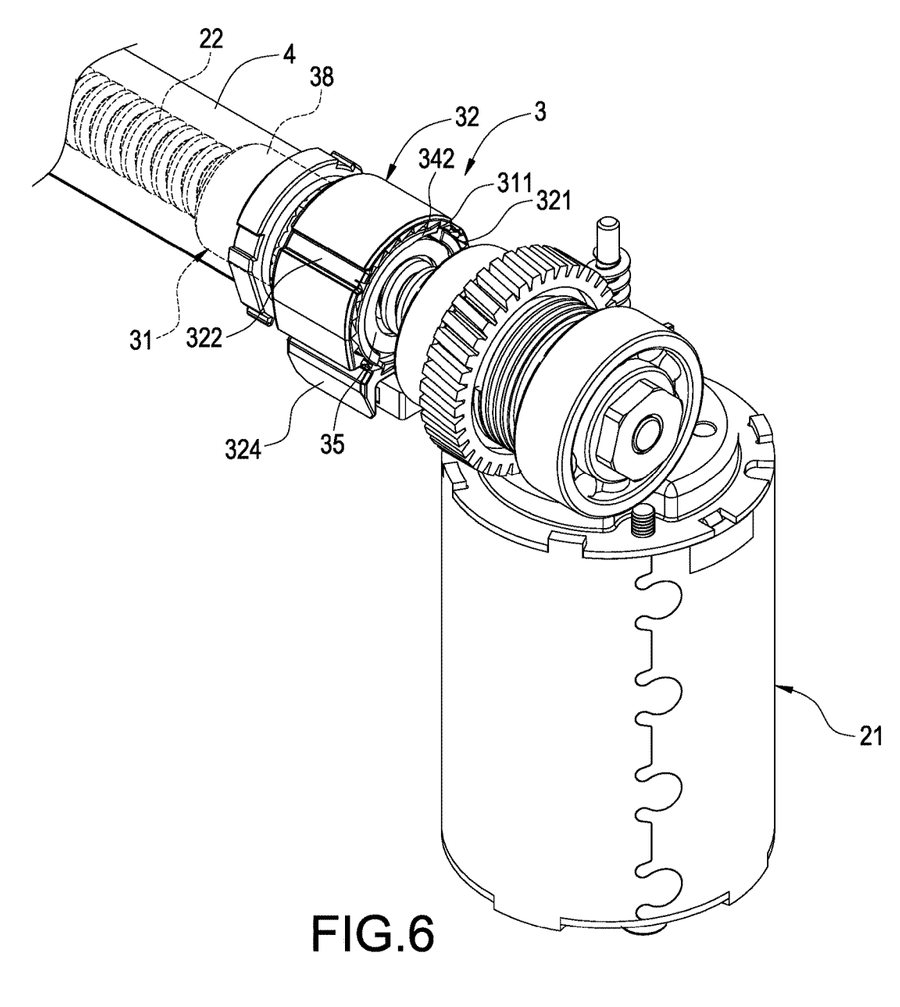
FIG. 6 is a perspective assembly view of the driving mechanism of the actuator.
Figure 7:
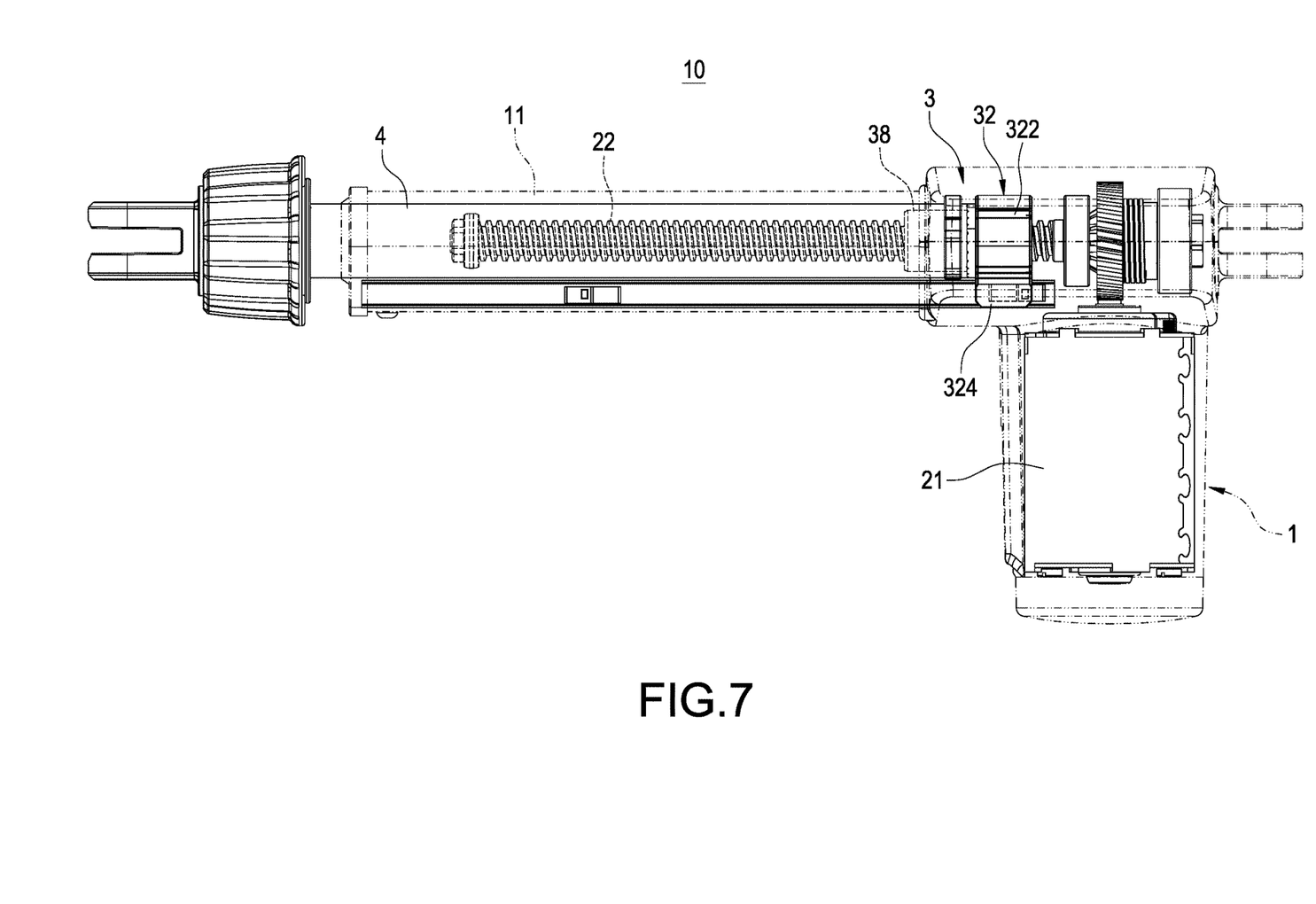
FIG. 7 is a schematic view showing a state of use of the actuator according to the present disclosure.
Figure 8:
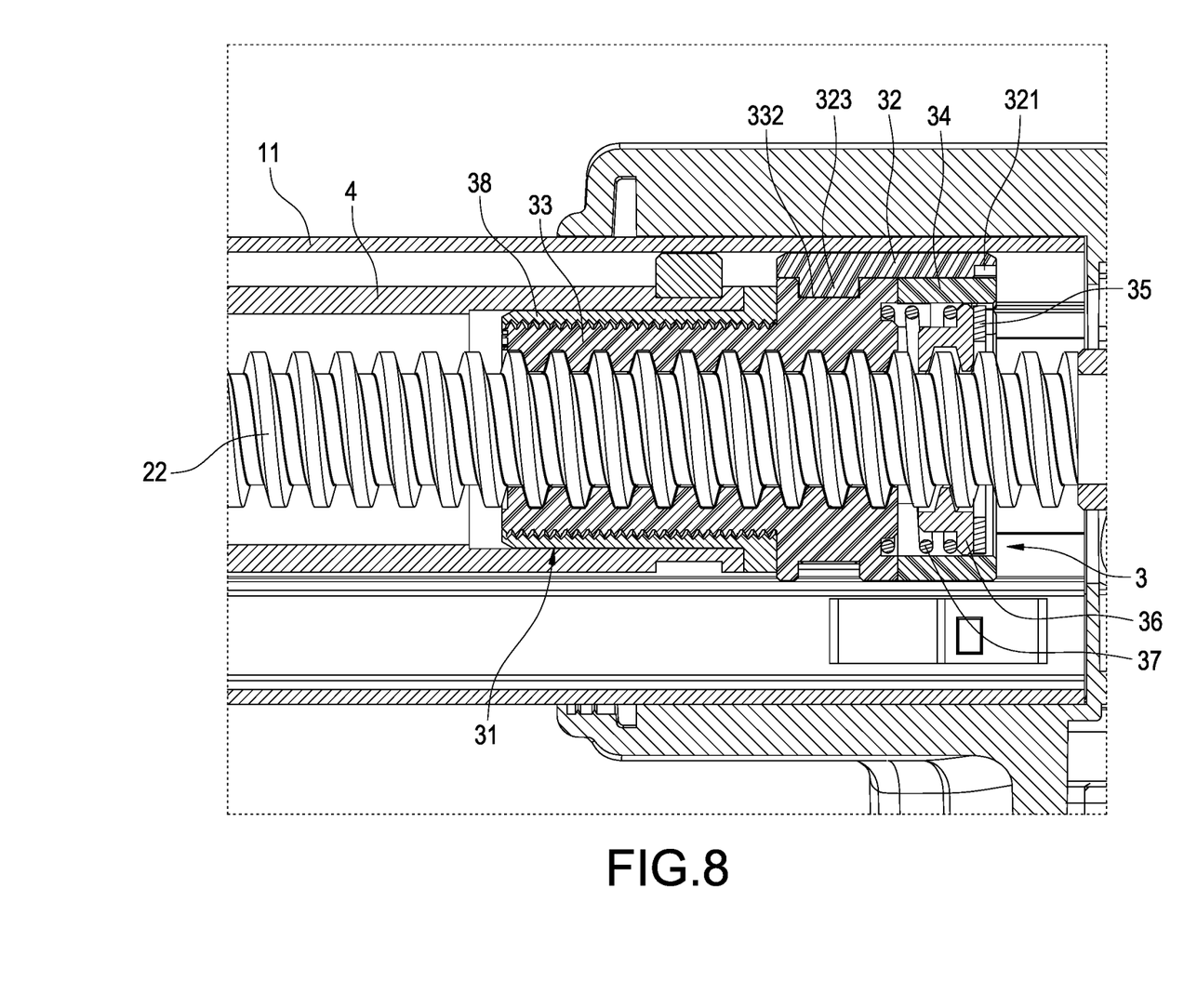
FIG. 8 is a partially cross sectional view of the actuator according to the present disclosure.
Figure 9:
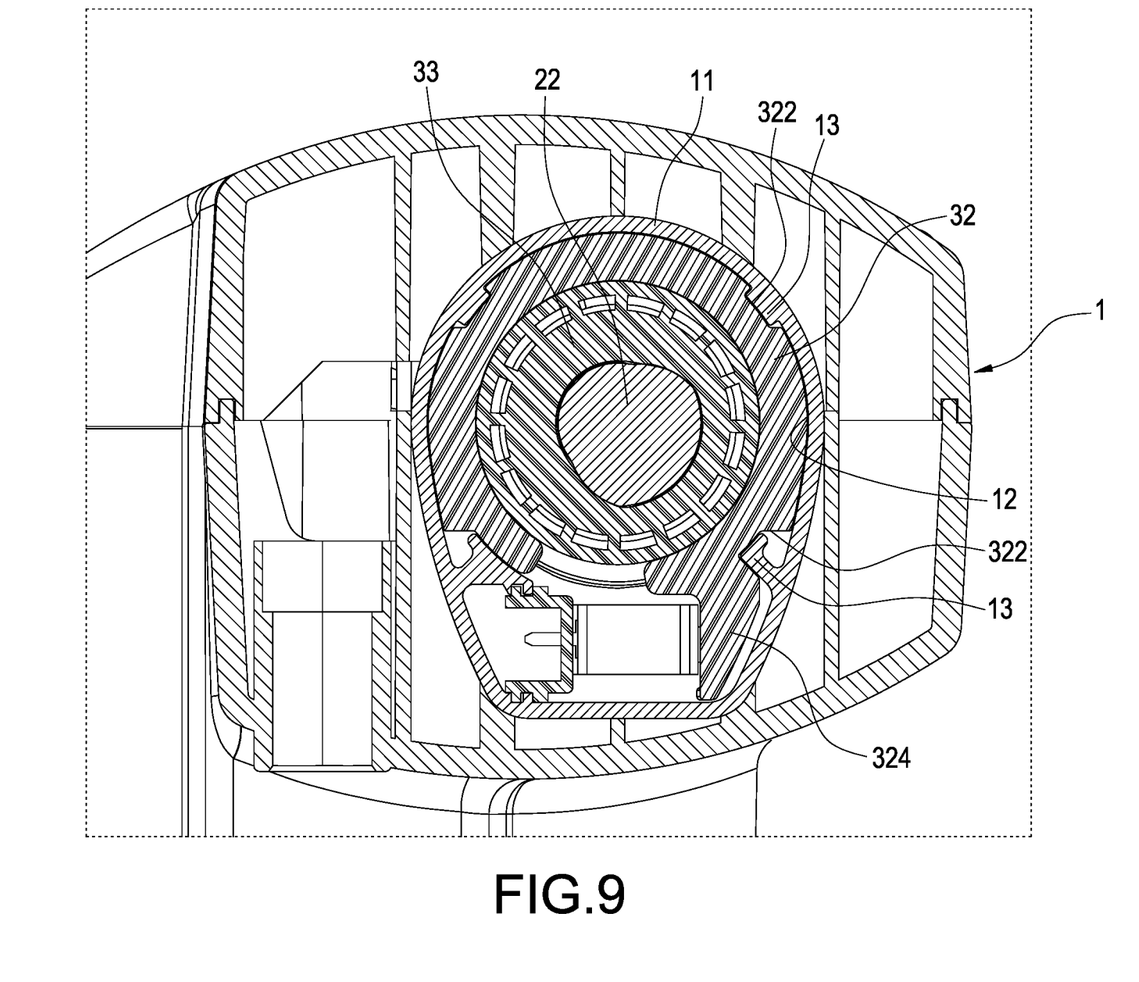
FIG. 9 is another partially cross-sectional view of the actuator according to the present disclosure.
Figure 10:
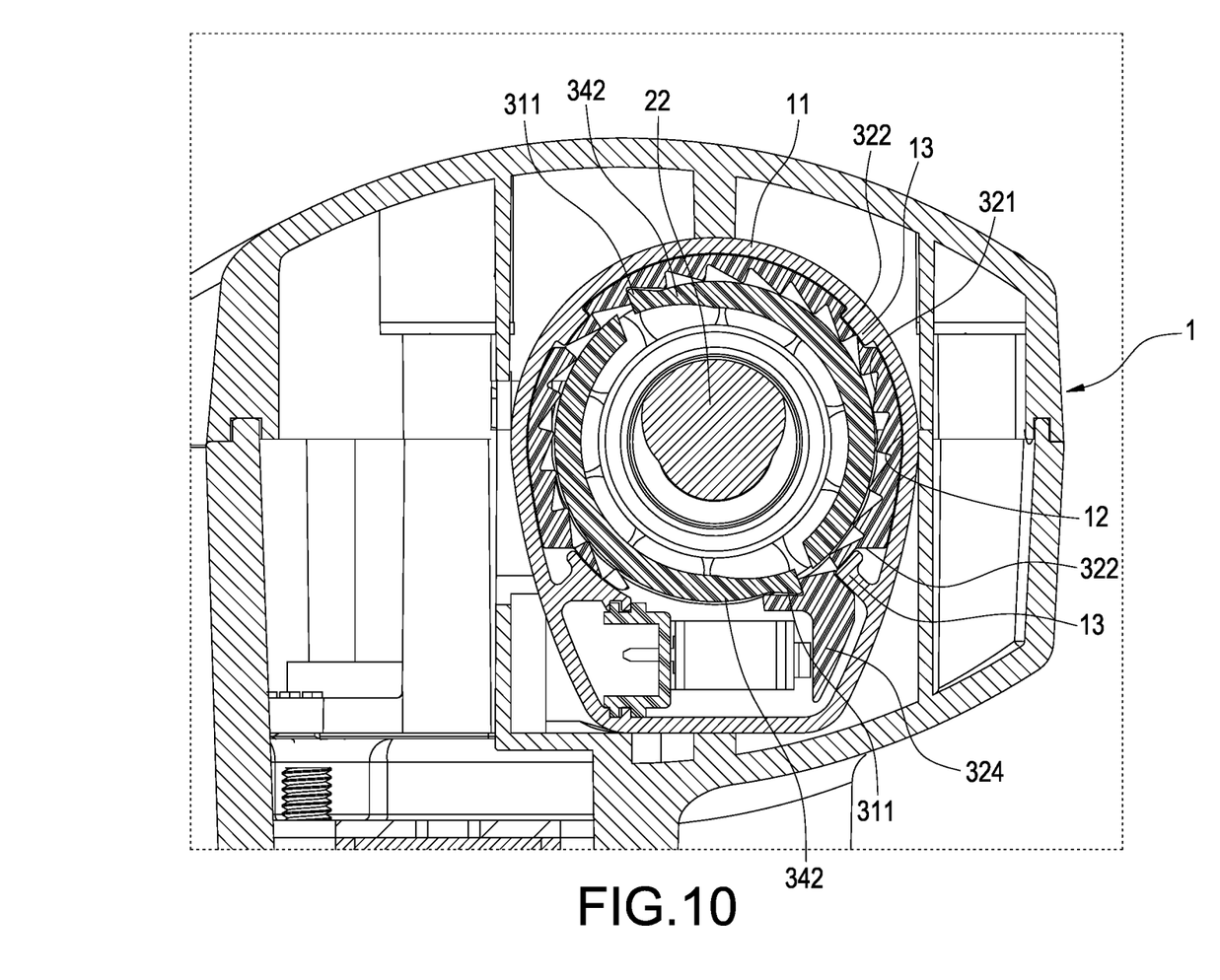
FIG. 10 is still another partially cross-sectional view of the actuator according to the present disclosure.
Figure 11:
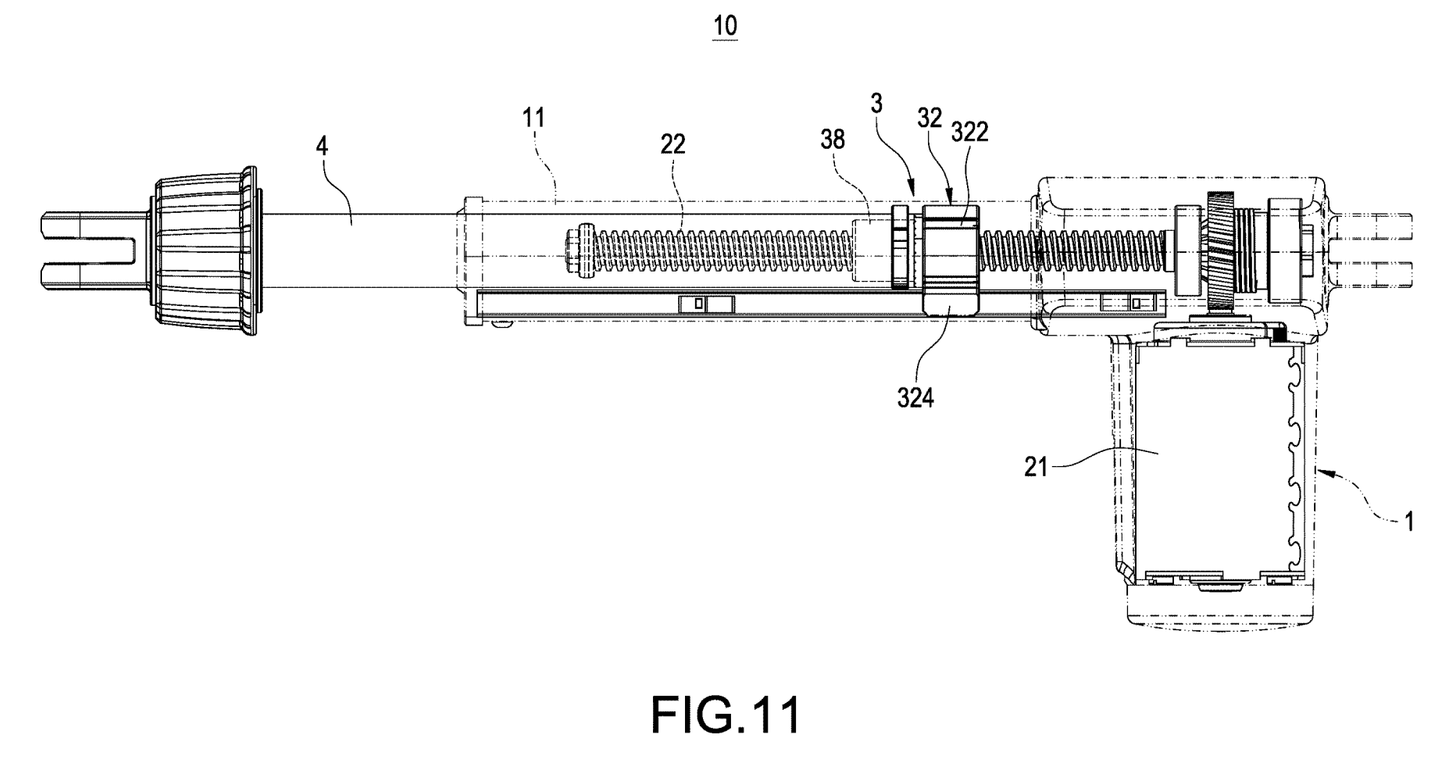
FIG. 11 is another schematic view showing a state of use of the actuator according to the present disclosure.
Figure 12:
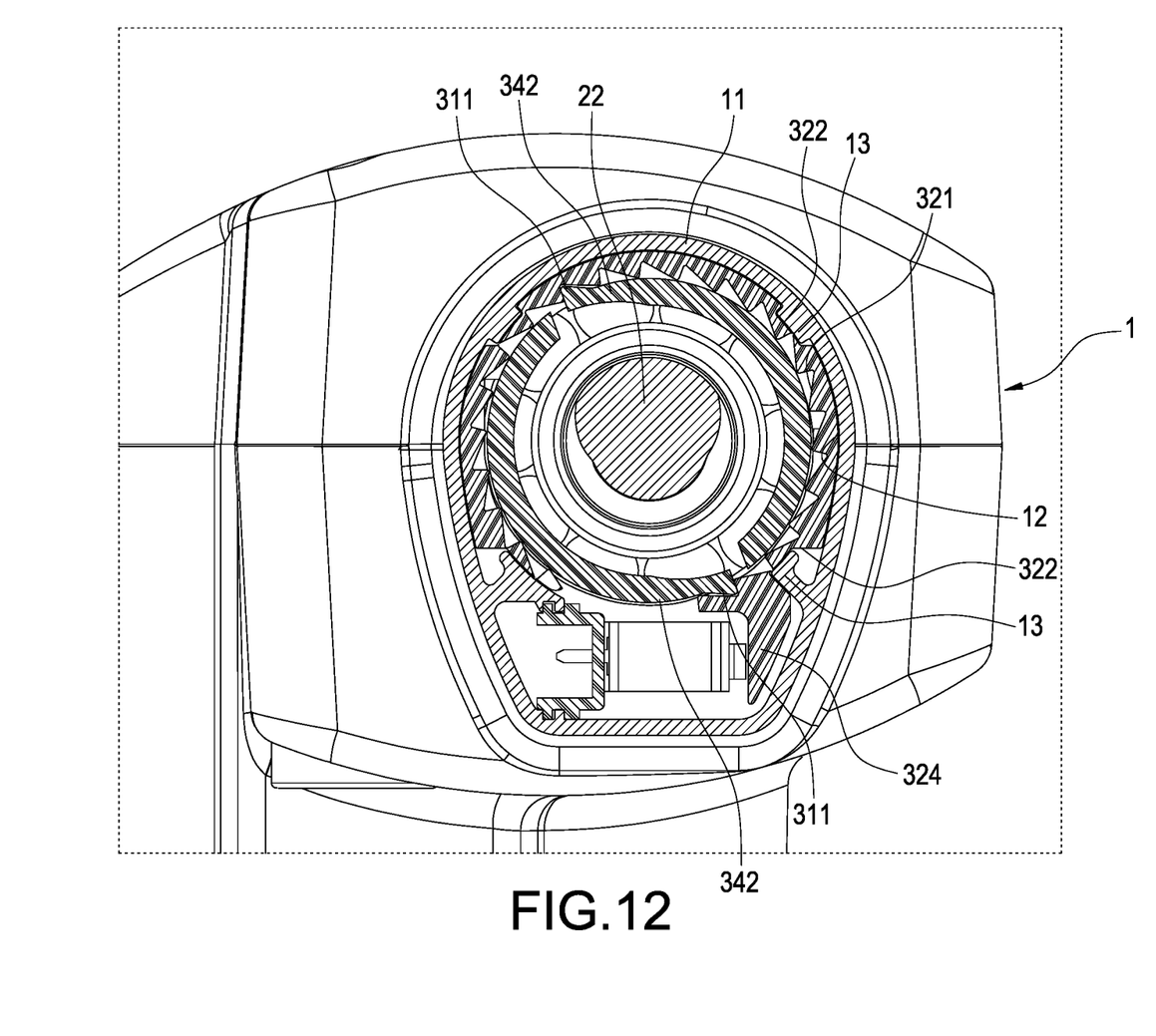
FIG. 12 is yet another partially cross-sectional view of the actuator according to the present disclosure.

Furthermore, as shown in FIG. 11 to FIG. 12, when the lead screw 22 drives the screw nut 31 to rotate toward the second rotational direction, the pawl 311 may slide relative to the ring ratchet 321. The screw nut 31 is not limited by the ratchet guiding sleeve 32 such that it may drive the inner tube 4 to retract inward swiftly, thereby achieving the effect of one-way quick release for the actuator 10 and the transmission structure 3 thereof.

In addition, as shown in FIG. 2 to FIG. 5 and FIG.8, the screw nut 31 further includes an engagement key 36 engaged with the lead screw 22. The engagement key 36 is a backup nut such that when the inner threads of the main body 33 are worn out and unable to engage with the lead screw 22 for transmission, the engagement key 36 may still engage with the lead screw 22 for transmission to drive the screw nut 31 to extend outward or retract inward normally. As a result, the use safety of the actuator 10 and the transmission structure thereof 3 may be increased.

Furthermore, when the screw nut 31 retracts inward swiftly, since the ratchet guiding sleeve 32 is a C-shaped collar and may elastically retain the screw nut 31, the frictional force between the screw nut 31 and the ratchet guiding sleeve 32 may be increased, thereby generating the brake function for the screw nut 31 via the ratchet guiding sleeve 32. Accordingly, the use safety of the actuator 10 and the transmission structure 30 thereof is enhanced.

In view of the above, the actuator and the transmission structure of the present disclosure may achieve the expected purpose of use and to overcome known drawbacks.

What is claimed is:

1. A transmission structure, comprising:
   a screw nut (31), comprising at least one pawl (311) extended therefrom; and
   a ratchet guiding sleeve (32), mounted on the screw nut (31), the screw nut (31) configured to rotate relative to the ratchet guiding sleeve (32), the ratchet guiding sleeve (32) comprising a ring ratchet (321) disposed on an inner circumference thereof and a plurality of track slots (322) disposed on an outer circumference thereof, and the at least one pawl (311) abutting against the ring ratchet (321),
   wherein the ring ratchet (321) is a mechanical mechanism capable of maintaining a rotational movement of the pawl (311) to be at single direction.

2. The transmission structure according to claim 1, wherein when the screw nut (31) rotates toward a first rotational direction, the at least one pawl (311) is blocked and retained by the ring ratchet (321); and
   when the screw nut (31) rotates toward a second rotational direction, the at least one pawl (311) slides relative to the ring ratchet (321), and the first rotational direction is opposite to the second rotational direction.

3. The transmission structure according to claim 1, wherein the screw nut (31) comprises a main body (33) and a collar (34), the main body (33) comprises a plurality of protrusions (331) extended from one end thereof, the collar (34) is fixed to the main body (33), the collar (34) comprises a plurality of notches (341) disposed on one end thereof, and each of the protrusions (331) is embedded in each of the notches (341).

4. The transmission structure according to claim 3, wherein the collar (34) is defined with a circumferential direction, the collar (34) comprises at least one elastic arm (342) extended from another end thereof and arranged along the circumferential direction, and the at least one pawl (331) protrudes outward from a rear end of the at least one elastic arm (342).

5. The transmission structure according to claim 3, wherein the main body (33) comprises a ring slot (332) disposed on an outer circumference thereof, the ratchet guiding sleeve (32) comprises a ring member (323) extended on an inner circumference thereof, and the ring member (323) is embedded in the ring slot (332) and is configured to rotate relative to the ring slot (332).

6. The transmission structure according to claim 3, wherein the screw nut (31) further comprises a retainer (35), an engagement key (36) and an elastic member (37), the collar (34) comprises a plurality of locking slots (343), the retainer (35) is fixed to one end of the collar (34) away from the main body (33), the retainer (35) comprises a plurality of pins (351) extended on an outer circumference thereof, each of the pins (351) is locked on each of the locking slots (343), the engagement key (36) is received inside the collar (34) and one end thereof is blocked and retained by the retainer (35), and the elastic member (37) is elastically supported between the engagement key (36) and the main body (33).

7. The transmission structure according to claim 3, wherein the screw nut (31) further comprises a connecting sleeve (38) mounted on an exterior of the main body (33).

8. The transmission structure according to claim 1, wherein the ratchet guiding sleeve (32) comprises a pressing member (324) protruded from the outer circumference thereof.

9. The transmission structure according to claim 1, wherein the ratchet guiding sleeve (32) comprises a C-shaped ring sleeve.

10. An actuator, comprising:
    a housing (1), comprising an outer tube (11), the outer tube (11) comprising an inner wall (12) and defined with an axial direction, the inner wall (12) comprising a plurality of protruding tracks (13) disposed along the axial direction;
    a driving mechanism (2), comprising a lead screw (22) penetrating to an internal of the outer tube (1); and
    a transmission structure (3), comprising:
       a screw nut (31), mounted to and engaged with the lead screw (22), and comprising at least one pawl (311) extended therefrom; and
       a ratchet guiding sleeve (32), mounted on the screw nut (31), the screw nut (31) configured to rotate relative to the ratchet guiding sleeve (32), the ratchet guiding sleeve (32) comprising a ring ratchet (321) disposed on an inner circumference thereof and a plurality of track slots (322) disposed on an outer circumference thereof, the at least one pawl (311) abutting against the ring ratchet (321), and the plurality of protruding tracks (13) embedded in the plurality of track slots (322).

11. The actuator according to claim 10, wherein when the screw nut (31) rotates toward a first rotational direction, the at least one pawl (311) is blocked and retained by the ring ratchet (321); and
    when the screw nut (31) rotates toward a second rotational direction, the at least one pawl (311) slides relative to the ring ratchet (321), and the first rotational direction is opposite to the second rotational direction.

12. The actuator according to claim 10, wherein the crew nut (31) comprises a main body (33) and a collar (34), the main body (33) comprises a plurality of protrusions (331) extended from one end thereof, the collar (34) is fixed to the main body (33), the collar (34) comprises a plurality of notches (341) disposed on one end thereof, and each of the protrusions (331) is embedded in each of the notches (341).

13. The actuator according to claim 12, wherein the collar (34) is defined with a circumferential direction, the collar (34) comprises at least one elastic arm (342) extended from another end thereof and arranged along the circumferential direction, and the at least one pawl (331) protrudes outward from a rear end of the at least one elastic arm (342).

14. The actuator according to claim 12, wherein the main body (33) comprises a ring slot (332) disposed on an outer circumference thereof, the ratchet guiding sleeve (32) comprises a ring member (323) extended on an inner circumference thereof, and the ring member (323) is embedded in the ring slot (332) and is configured to rotate relative to the ring slot (332).

15. The actuator according to claim 12, wherein the screw nut (31) further comprises a retainer (35), an engagement key (36) and an elastic member (37), the collar (34) comprises a plurality of locking slots (343), the retainer (35) is fixed to one end of the collar (34) away from the main body (33), the retainer (35) comprises a plurality of pins (351) extended on an outer circumference thereof, each of the pins (351) is locked on each of the locking slots (343), the engagement key (36) is mounted to and engaged with the lead screw (22), the engagement key (36) is received inside the collar (34) and one end thereof is blocked and retained by the retainer (35), and the elastic member (37) is elastically supported between the engagement key (36) and the main body (33).

16. The actuator according to claim 12, wherein the screw nut (31) further comprises a connecting sleeve (38) mounted on an exterior of the main body (33).

17. The actuator according to claim 10, wherein the ratchet guiding sleeve (32) comprises a pressing member (324) protruded from the outer circumference thereof.

18. The actuator according to claim 10, wherein the ratchet guiding sleeve (32) comprises a C-shaped ring sleeve.

* * * * *